United States Patent
Bisson

(10) Patent No.: US 9,174,586 B2
(45) Date of Patent: Nov. 3, 2015

(54) STORAGE COMPARTMENT APPARATUS FOR DOOR OF A VEHICLE

(71) Applicant: NYX, Inc., Livonia, MI (US)

(72) Inventor: Jeffrey Michael Bisson, Amherstburg (CA)

(73) Assignee: NYX, Inc., Livonia, MI (US)

( * ) Notice: Subject to any disclaimer, the term of this patent is extended or adjusted under 35 U.S.C. 154(b) by 0 days.

(21) Appl. No.: 14/075,283

(22) Filed: Nov. 8, 2013

(65) Prior Publication Data

US 2015/0130207 A1    May 14, 2015

(51) Int. Cl.
*B60R 7/00* (2006.01)
*B60R 11/00* (2006.01)
*B60R 21/00* (2006.01)

(52) U.S. Cl.
CPC ......... *B60R 11/00* (2013.01); *B60R 2011/0021* (2013.01); *B60R 2021/0055* (2013.01)

(58) Field of Classification Search
CPC ...... B60R 21/0428; B60R 9/02; B60R 11/00; B60J 5/045
USPC ............. 296/37.13, 37.8, 146.6, 187.12; 224/915
See application file for complete search history.

(56) References Cited

U.S. PATENT DOCUMENTS

| 3,081,126 | A | * | 3/1963 | Theberge | 296/37.1 |
| 4,378,888 | A | * | 4/1983 | Reed | 211/63 |
| 5,800,004 | A | | 9/1998 | Ackeret | |
| 6,095,388 | A | * | 8/2000 | Neville, Sr. | 224/556 |
| 7,594,686 | B2 | | 9/2009 | Augustyn | |
| 7,695,051 | B2 | * | 4/2010 | Abe | 296/187.03 |
| 7,712,814 | B2 | * | 5/2010 | Matsui et al. | 296/37.8 |
| 8,387,640 | B2 | | 3/2013 | Kim | |
| 8,827,354 | B2 | * | 9/2014 | Wolff et al. | 296/187.05 |
| 2009/0256391 | A1 | * | 10/2009 | Hall et al. | 296/187.12 |
| 2011/0169302 | A1 | | 7/2011 | Deng et al. | |
| 2012/0250929 | A1 | * | 10/2012 | Subat et al. | 381/389 |
| 2013/0088035 | A1 | | 4/2013 | Cha et al. | |
| 2013/0181475 | A1 | * | 7/2013 | Torii | 296/146.7 |

FOREIGN PATENT DOCUMENTS

| EP | 0325896 | 9/1987 |
| EP | 0243954 | 11/1987 |
| EP | 1798110 | 6/2007 |
| EP | 2258590 | 12/2010 |
| WO | 9527634 | 10/1995 |
| WO | 0212021 | 2/2002 |

* cited by examiner

*Primary Examiner* — Pinel Roman
(74) *Attorney, Agent, or Firm* — Carlson, Gaskey & Olds, P.C.

(57) ABSTRACT

A storage compartment apparatus for a door of a vehicle includes an elongated body that extends along an axis. The elongated body includes impact-absorbing elements arranged along the axis and an axially elongated storage compartment opening at an axial end and coextending with the impact-absorbing elements along the axis.

20 Claims, 2 Drawing Sheets

STORAGE COMPARTMENT APPARATUS FOR DOOR OF A VEHICLE

BACKGROUND

Vehicle doors, such as those used in automobiles, typically include a door panel that is attached to a door frame. To protect vehicle occupants from collision impact, the door panel may include numerous structures, such as guard beams, side bolsters, impact blocks and the like. The door panel can also include a lock mechanism, window lift mechanism and a storage compartment, such as a map compartment, on the interior of the door panel. However, one challenge in providing such storage compartments is that the available space within the door panel is limited.

SUMMARY

Disclosed is a storage compartment apparatus for a door of a vehicle. The apparatus includes an elongated body that extends along an axis. The elongated body includes impact-absorbing elements arranged along the axis and an axially elongated storage compartment that opens at an axial end and coextends with the impact-absorbing elements along the axis. Also disclosed is a door panel that includes the storage compartment apparatus.

In another aspect, a storage compartment apparatus for a door of a vehicle includes an elongated body that extends along an axis. The elongated body includes first and second sections connected together by a hinge. The first and second sections include impact-absorbing elements. The first section defines a first concavity and the second section defines a second concavity. The first and second sections are pivotable about the hinge from an open position to a closed position in which the first and second concavities are in proximity of each other and form an axially elongated storage compartment that opens at an axial end and coextends with the impact-absorbing elements along the axis.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
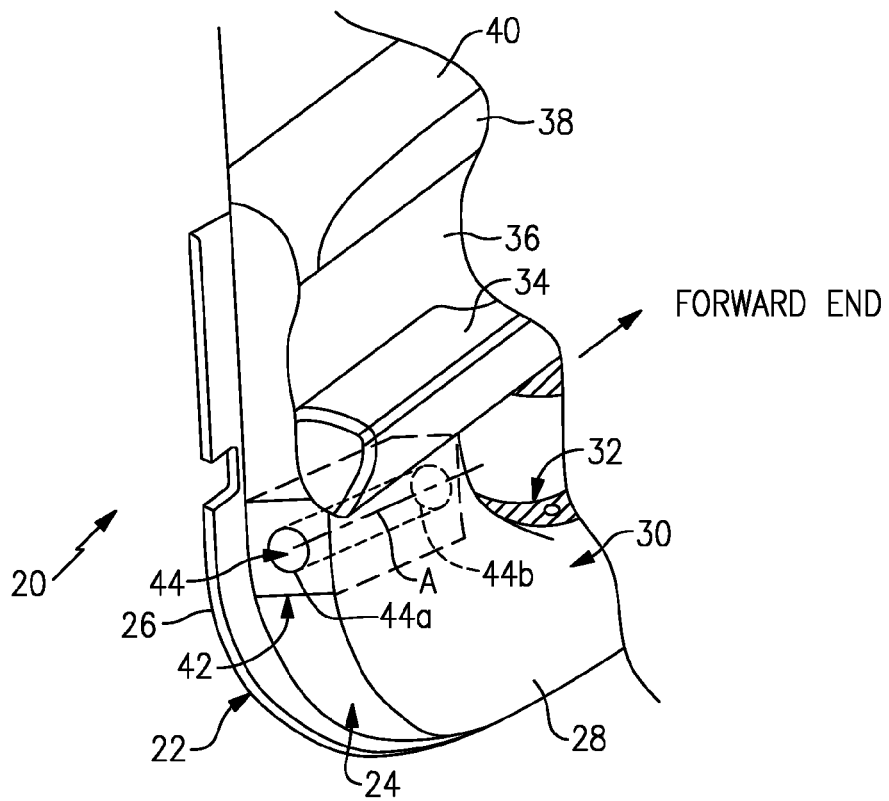
FIG. 1 illustrates an example vehicle door having a door panel with a storage compartment apparatus.

FIG. 1 schematically illustrates a portion of a vehicle door 20. For the purpose of this description, only a portion of the door 20 is shown. In general, the door 20 extends between a forward end and an aft end 22. As can be appreciated, when the door 20 is in a closed position on a vehicle, the forward end is oriented toward the front of the vehicle and the aft end 22 is oriented toward the rear of the vehicle.

The door 20 includes a door panel 24 that is secured to a door frame (not shown) in a known manner. The door panel 24 generally extends between an exterior surface 26 and an interior surface 28 that is oriented toward a passenger compartment of a vehicle. In the illustrated example, the door panel 24 generally includes a carrier 30 that defines, at least in part, a map pocket 32, an arm rest 34, a mid-bolster 36, an applique' 38 and an upper bolster 40. However, it is to be appreciated that the illustrated design of the door panel 24 shown can vary with regard to such features.

The door panel 24 also includes a storage compartment apparatus 42 (hereafter "apparatus 42"), located between the exterior surface 26 and the interior surface 28. The apparatus 42 has an axially elongated storage compartment 44 that is adapted in shape to receive and store an umbrella, for example. The apparatus 42 also serves as an impact block and, thus, combines several functionalities into a single component, which conserves space in the door panel 24.

Figure 2:
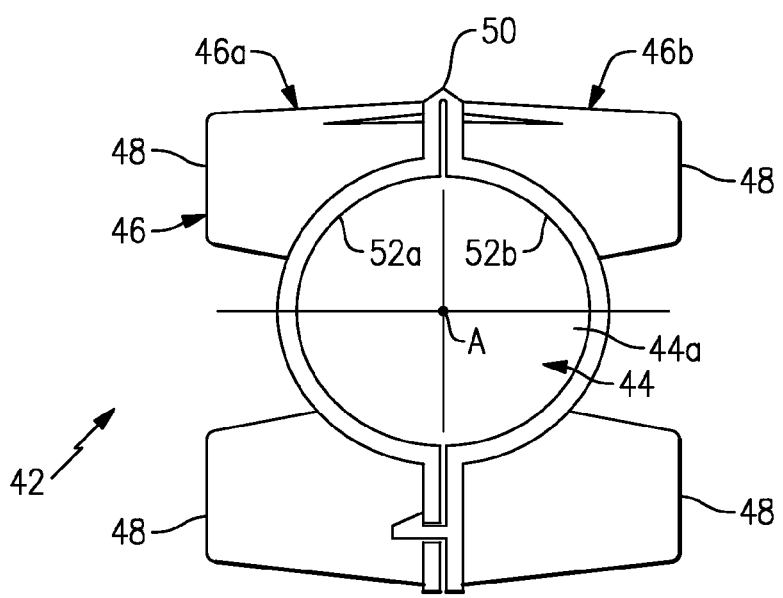
FIG. 2 illustrates an isolated, axial view of the storage compartment apparatus of FIG. 1 in a fully closed position.

FIG. 2 shows an axial view of the apparatus 42. The apparatus 42 includes an elongated body 46 (also shown schematically in FIG. 1) that extends along an axis A. In this example, the axis A is the central axis of the elongated body 46. The elongated body 46 includes a plurality of impact-absorbing elements 48 that are arranged along the axis A. Conceptually, the impact-absorbing elements are somewhat similarly arranged as an egg carton. The axially elongated storage compartment 44 opens to the aft end 22 at an axial end 44a (see also FIG. 1) and coextends with the impact-absorbing elements 48 along the axis A.

Figure 3:
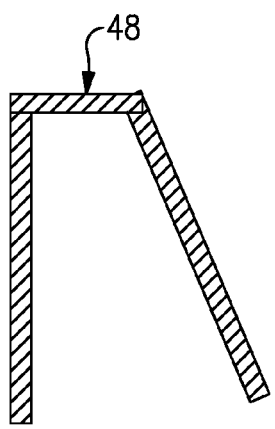
FIG. 3 illustrates a sectioned, isolated view of an impact-absorbing element of the storage compartment apparatus of FIG. 2.

The impact-absorbing elements 48 dissipate kinetic energy upon impact. For example, the function of energy dissipation can be served by using a hollow geometry, such as the cone-shaped hollow geometry shown in FIG. 3. Additionally or alternatively, the function of energy dissipation can be served by other geometries, such as porous structures and the use of energy dissipating materials.

The elongated body 46 includes a first section 46a and a second section 46b that are connected together by a hinge 50. In this example, the hinge 50 is a "living hinge" that is made of an equivalent material as the first and second sections 46a/46b. In one example, the first and second sections 46a/46b and the hinge 50 are made of a polymeric material. For example, the polymeric material can be a thermoplastic material. The hinge 50 is a flexible narrow strip or band that connects the first and second sections 46a/46b. For example, the hinge 50 can bend without fracturing or breaking such the first and second sections 46a/46b become disconnected. The first and second sections 46a/46b define respective concavities 52a/52b, which each define a portion of the axially elongated storage compartment 44.

Figure 4:
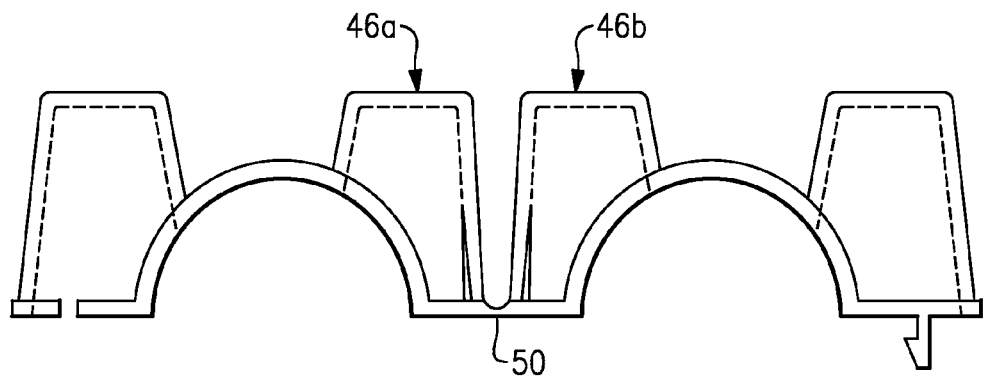
FIG. 4 illustrates the storage compartment apparatus of FIG. 2 in an initial, open position.
Figure 5:
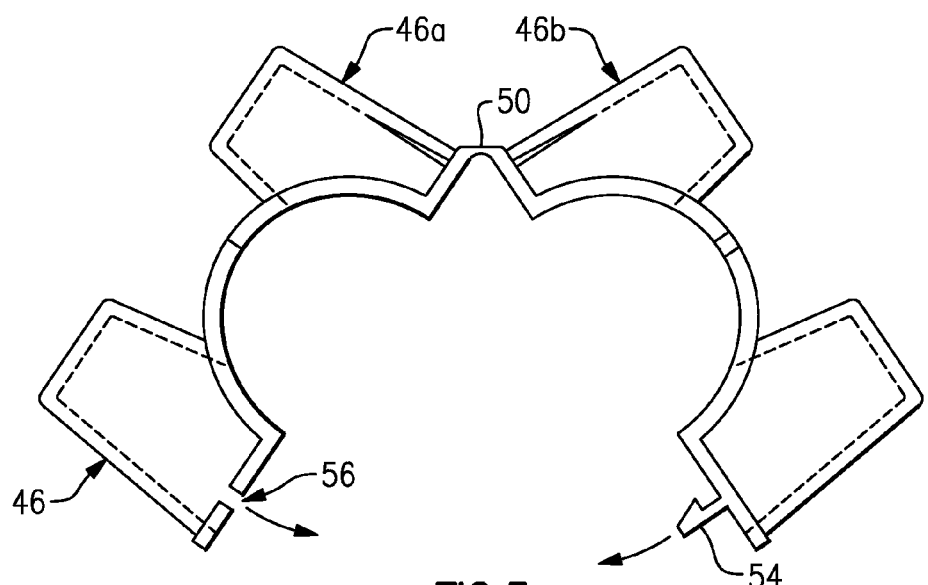
FIG. 5 illustrates the storage compartment apparatus of FIG. 2 in an intermediate position between an open position and a fully closed position.

In one example, the apparatus 42 can be molded of the plastic material such that it initially has the geometry shown in FIG. 4. In one example, the apparatus 42 can be molded in a die draw, which keeps tooling costs relatively low. The first and second sections 46a/46b are then pivoted about the hinge 50 from the open position shown in FIG. 4 through an intermediate position shown in FIG. 5 to the fully closed position shown in FIG. 2.

In this example, the elongated body 46 includes a latch 54 opposite from the hinge 50 (180° opposite from the hinge in the fully closed position) that is engageable with a latch opening 56 to secure the first and second sections 46a/46b in the closed position. In the closed position, the first and second concavities 52a/52b are in proximity to each other and form the axially elongated storage compartment 44 with the opening at the axial end 44a. In this example, each of the concavities 52a/52b has a half-circle cross-section such that in the fully closed position the axially elongated storage compartment 44 has a circular cross-section (taken perpendicular to the axis A). Alternatively, other mechanisms or techniques can be used to secure the first and second sections 46a/46b in the closed position, such as, but not limited to, other latch designs, screws or fasteners, adhesives, or the like.

Once in the closed position, the central axis of the axially elongated storage compartment 44 is collinear with the central axis A of the elongated body 46. The apparatus 42 can then be installed into the door panel 24. In the example shown (FIG. 1), the apparatus 42 is installed such that the axis of the axially elongated storage compartment 44 is generally horizontal. In other examples, however, the axis can be angled relative to horizontal. Additionally, an interior, opposite axial end 44b (FIG. 1) can either be closed or can open into the map pocket 32.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A storage compartment apparatus for a door of a vehicle, the apparatus comprising:
   an elongated body extending along an axis and including:
      an axially-extending hinge,
      a series of geometric-shaped hollow impact-absorbing elements arranged along the axis, and
      an axially elongated storage compartment opening at an axial end and coextending with the impact-absorbing elements along the axis.

2. The apparatus as recited in claim 1, wherein the hinge is a living hinge.

3. The apparatus as recited in claim 1, wherein the axially elongated storage compartment is cylindrical.

4. The apparatus as recited in claim 1, wherein the axis is a central axis of the elongated body, and the storage compartment is collinear with the central axis.

5. The apparatus as recited in claim 1, wherein the geometric-shaped hollow impact-absorbing elements are cone-shaped.

6. A door panel comprising:
   storage compartment apparatus including an elongated body extending along an axis and including:
      an axially-extending hinge,
      a series of geometric-shaped hollow impact-absorbing elements arranged along the axis, and
      an axially elongated storage compartment opening at an axial end and coextending with the impact-absorbing elements along the axis.

7. The door panel as recited in claim 6, wherein impact-absorbing elements are geometrically configured to absorb energy upon impact.

8. The door panel as recited in claim 6, wherein the hinge is a living hinge.

9. The door panel as recited in claim 6, wherein the axially elongated storage compartment is cylindrical.

10. The door panel as recited in claim 6, wherein the axis is a central axis of the elongated body, and the storage compartment is collinear with the central axis.

11. The door panel as recited in claim 6, wherein, relative to an aft end and a forward end of the door panel, the axially elongated storage compartment opens to the aft end.

12. A storage compartment apparatus for a door of a vehicle, the apparatus comprising:
   an elongated body extending along an axis and including first and second sections connected together by an axially-extending hinge, the first and second sections including impact-absorbing elements, the first section defining a first concavity and the second section defining a second concavity, the first and second sections being pivotable about the hinge from an open position to a closed position in which the first and second concavities are in proximity of each other and form an axially elongated storage compartment opening at an axial end and coextending with the impact-absorbing elements along the axis, the first and second sections including, respectively, a latch opening and a latch located opposite the hinge, the latch engaging the latch opening in the closed position and securing the first and second sections together.

13. The apparatus as recited in claim 12, wherein the hinge is a living hinge made of an equivalent material as the first and second sections.

14. The apparatus as recited in claim 12, wherein the axially elongated storage compartment has a circular cross-section taken perpendicular to the axis.

15. The apparatus as recited in claim 12, wherein the impact-absorbing elements are a series of geometric-shaped hollow impact-absorbing elements arranged along the axis.

16. The apparatus as recited in claim 15, wherein the geometric-shaped hollow impact-absorbing elements are circumferentially spaced-apart around the perimeter of the first and second sections.

17. The apparatus as recited in claim 16, wherein the geometric-shaped hollow impact-absorbing elements are cone-shaped.

18. The apparatus as recited in claim 15, wherein in the closed position the geometric-shaped hollow impact-absorbing elements on the first section extend in an opposite direction from the geometric-shaped hollow impact-absorbing elements on the second section.

19. The apparatus as recited in claim 15, wherein a portion of the geometric-shaped hollow impact-absorbing elements on each of the first and second sections are located adjacent the hinge and another portion of the geometric-shaped hollow impact-absorbing elements on each of the first and second sections are located adjacent, respectively, the latch opening and the latch.

20. The apparatus as recited in claim 12, wherein the impact-absorbing elements are a series of geometric-shaped hollow impact-absorbing elements on the exterior of the first and second sections.

* * * * *